US010156491B2

(12) United States Patent
    Fetisov

(10) Patent No.: US 10,156,491 B2
(45) Date of Patent: Dec. 18, 2018

(54) CORROSION RESISTANT PRESSURE MODULE FOR PROCESS FLUID PRESSURE TRANSMITTER

(71) Applicant: Rosemount Inc., Chanhassen, MN (US)

(72) Inventor: Aleksandr Vladimirovich Fetisov, Chelyabinsk (RU)

(73) Assignee: Rosemount Inc., Shakopee, MN (US)

( * ) Notice: Subject to any disclaimer, the term of this patent is extended or adjusted under 35 U.S.C. 154(b) by 93 days.

(21) Appl. No.: 15/034,123

(22) PCT Filed: Apr. 25, 2014

(86) PCT No.: PCT/RU2014/000304
§ 371 (c)(1),
(2) Date: May 3, 2016

(87) PCT Pub. No.: WO2015/163784
PCT Pub. Date: Oct. 29, 2015

(65) Prior Publication Data
US 2016/0282210 A1 Sep. 29, 2016

(51) Int. Cl.
G01L 19/06 (2006.01)
G01L 19/14 (2006.01)
G01L 19/00 (2006.01)

(52) U.S. Cl.
CPC ........ G01L 19/0046 (2013.01); G01L 19/144 (2013.01)

(58) Field of Classification Search
CPC ..... G01L 19/00; G01L 19/0046; G01L 19/06; G01L 19/14; G01L 19/144
See application file for complete search history.

(56) References Cited

U.S. PATENT DOCUMENTS 5,230,248 A * 7/1993 Cucci .................... G01L 9/0044
                                                            73/706
5,665,920 A * 9/1997 Martin .................. G01L 9/0075
                                                            73/715
(Continued)

FOREIGN PATENT DOCUMENTS

CN    1284163 A    2/2001
CN    1461406 A    12/2003
(Continued)

OTHER PUBLICATIONS

International Search Report for PCT/RU2014/000304. 4 pages.
(Continued)

Primary Examiner — Nguyen Ha
(74) Attorney, Agent, or Firm — Christopher R. Christenson; Kelly, Holt & Christenson, P.L.L.C.

(57) ABSTRACT

A pressure sensor module for a process pressure transmitter is provided. The pressure sensor module includes a first member formed of a metal suitable for exposure to seawater. The first member has a passageway extending therethrough. An isolation diaphragm is coupled to the first member and has a first side configured to contact a process fluid and an opposite side in fluidic communication with the passageway of the first member. A second member is formed of a different metal than the first member and is mechanically coupled to the first member to define a chamber that is fluidically coupled to the passageway. A pressure sensor is disposed to sense a pressure within the chamber. A seal is coupled to the first and second members to seal an interface between the first and second members.

16 Claims, 3 Drawing Sheets

(56) References Cited

U.S. PATENT DOCUMENTS

| | | | | |
|---|---|---|---|---|
| 6,055,864 | A | * | 5/2000 | Stiller ................ G01L 19/0084 73/718 |
| 6,615,669 | B1 | * | 9/2003 | Nishimura .......... G01L 19/0038 73/706 |
| 2003/0151126 | A1 | * | 8/2003 | Scheurich ............ G01L 19/003 257/682 |
| 2006/0000288 | A1 | * | 1/2006 | Pham ................... G01L 19/143 73/716 |
| 2007/0220989 | A1 | * | 9/2007 | Uchigashima ........ G01L 9/0042 73/756 |
| 2011/0290032 | A1 | * | 12/2011 | Wang ................... G01L 9/0055 73/727 |
| 2013/0033841 | A1 | | 2/2013 | Eckhardt et al. |
| 2013/0068029 | A1 | * | 3/2013 | Romo .................. G01L 13/026 73/706 |
| 2013/0160560 | A1 | | 6/2013 | Strei et al. |
| 2015/0346045 | A1 | * | 12/2015 | Habibi ................. G01L 9/0052 73/754 |

FOREIGN PATENT DOCUMENTS

| | | | |
|---|---|---|---|
| CN | 102023066 | A | 4/2011 |
| DE | 20 2004 020869 | U1 | 3/2006 |
| JP | 2000-337987 | A | 12/2000 |
| JP | 2003-060172 | A | 2/2003 |
| JP | 2003050172 | A * | 2/2003 ............. G01L 19/14 |
| JP | 2013-056841 | A | 2/2013 |

OTHER PUBLICATIONS

First Chinese Office Action for Chinese Patent Application No. 201480032479.5 dated Sep. 27, 2016, 13 pages.

Second Office Action for Chinese Patent Application No. 201480032479. 5, dated May 24, 2017, 14 pages including English translation.

Office Action for Japanese Patent Application No. 2016-564192, dated Aug. 8, 2017, 17 pages including English translation.

Microfilm of Japanese Utility Model Application No. S59-009660 (JP S60-122846 U), 2 pages.

Office Action for Canadian Patent Application No. 2,946,276, dated Aug. 25, 2017, 4 pages.

Third Office Action for Chinese Patent Application No. 201480032479. 5, dated Nov. 14, 2017, 15 pages.

EPO Communication pursuant to Article 94(3), dated Apr. 12, 2018, for European Patent Application No. 14799053.5, 5 pages.

Second Office Action dated Mar. 6, 2018, for Japanese Patent Application No. 2016-564192, 5 pages including English translation.

Office Action dated Jul. 26, 2018 for Canadian Patent Application No. 2,946,276, 3 pages.

* cited by examiner

CORROSION RESISTANT PRESSURE MODULE FOR PROCESS FLUID PRESSURE TRANSMITTER

CROSS-REFERENCE TO RELATED APPLICATION

This Application is a Section 371 National Stage Application of International Application No. PCT/RU2014/000304, filed Apr. 25, 2014 and published as WO 2015/163784 A1 on Oct. 29, 2015, the contents of which are hereby incorporated by reference in their entirety.

BACKGROUND

Industrial process control systems are used to monitor and control industrial processes which produce or transfer liquids or the like. In such systems, it is typically important to measure "process variable" such as temperatures, pressures, flow rates, and others. Process control transmitters are used to measure such process variables and transmit information related to the measured process variable back to a central location such as a central control room.

One type of process variable transmitter is a pressure transmitter which measures pressures, or pressure differences between two pressures, of process fluids and provides an output related to the pressures or pressure differences. In the case of differential pressures, the pressure difference may, in turn, represent a flow rate, a level of a process fluid in a vessel, or other process variable. The pressure transmitter is configured to transmit the pressure information back to the central control room, typically via a two-wire process control loop. However, other techniques, such as wireless communication techniques may be used as well.

Process pressure transmitters generally sense pressure using a pressure sensor fluidically coupled to at least one isolation diaphragm. The isolation diaphragm isolates the pressure sensor from process fluids that are being sensed. Process fluids, which can be highly corrosive, are thus kept isolated from the pressure sensor in order to avoid corrosion or damage to the pressure sensor. Pressure is transferred from the isolation diaphragm to the pressure sensor using a substantially incompressible, inert fill fluid. The pressure sensor itself has a physical structure such as a sensing diaphragm that reacts to the pressure, such as by deforming. The pressure sensor also includes an electrical structure, such as a strain gauge or capacitive plate or electrode that reacts to the physical deformation. For example, some known pressure sensors have a deflectable diaphragm that bears a capacitive plate or electrode such that deflection of the diaphragm produces a change in the sensor's capacitance. However, a variety of other techniques are known.

Some process pressure transmitters operate in the vicinity of, or within, seawater. Accordingly, such marine pressure transmitters are subject to the significant corrosive effects of seawater. In order to provide a robust design that can operate for an acceptable product lifetime, certain design considerations become important. For example, selecting a material that is substantially impervious to the corrosive effects of seawater may provide a robust design, however, the material costs for exotic alloys that provide such protection may result in a cost prohibitive design. Titanium, for example, is completely impervious to seawater-induced corrosion, but has been found to be substantially impossible to weld with other alloys and materials, such as stainless steel. Moreover, it is difficult to solder the two materials together. Further still, a pressure transmitter built completely from titanium is not cost effective.

Providing a cost effective process pressure transmitter that is adapted for prolonged exposure to seawater would provide an important improvement for marine-based process control environments.

SUMMARY

A pressure sensor module for a process pressure transmitter is provided. The pressure sensor module includes a first member formed of a metal suitable for exposure to seawater. The first member has a passageway extending therethrough. An isolation diaphragm is coupled to the first member and has a first side configured to contact a process fluid and an opposite side in fluidic communication with the passageway of the first member. A second member is formed of a different metal than the first member and is mechanically coupled to the first member to define a chamber that is fluidically coupled to the passageway. A pressure sensor is disposed to sense a pressure within the chamber. A seal is coupled to the first and second members to seal an interface between the first and second members.

DETAILED DESCRIPTION OF ILLUSTRATIVE EMBODIMENTS

Figure 1:
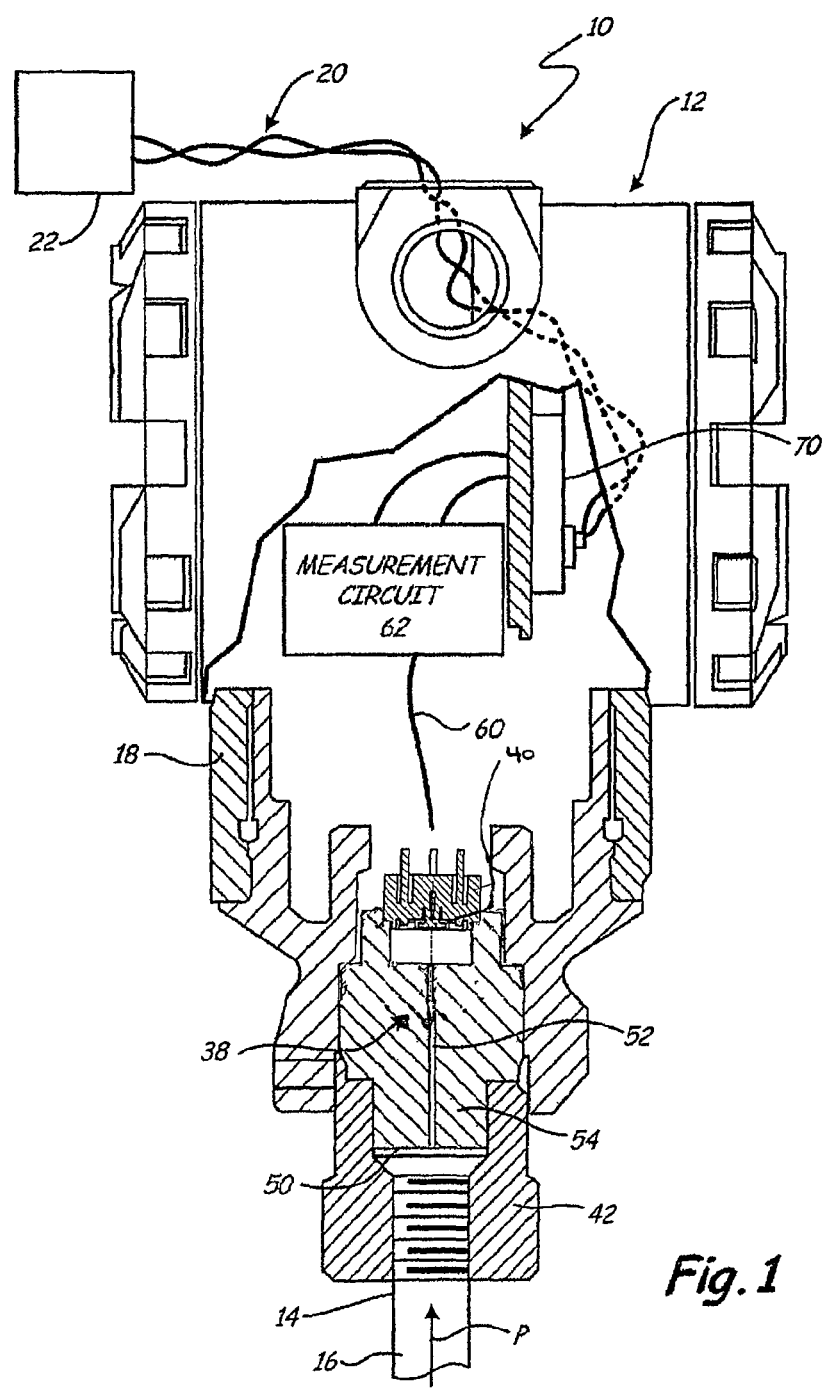
FIG. 1 is a diagrammatic view of a process fluid pressure transmitter with which embodiments of the present invention are particularly useful.

FIG. 1 shows an exemplary process fluid pressure transmitter 12 with which embodiments of the present invention are particularly useful. Process control or measurement system 10 includes a pressure transmitter 12 coupled to process piping 14 which carries a process fluid 16. (Transmitter 12 is a measurement component of system 10.) The process fluid 16 applies a pressure P to the pressure transmitter 12. Pressure transmitter 12 provides an output, for example on a two-wire process control loop 20 to a remote location such as a control room 22. The process control loop 20 can operate in accordance with any appropriate process communication protocol. In one configuration, process control loop 20 comprises a two-wire process control loop in which an analog current level is used to represent a "process variable" related to the process pressure P. In another example implementation, the process control loop 20 carries a digital value which is related to the process pressure P. Examples of such protocols include the Highway Addressable Remote Transducer (HART®) or FOUNDATION™ Fieldbus communication protocol. Another example process control loop comprises a wireless communication link, such as that in accordance with IEC62591. In such a configuration, element 20 represents a wireless communication link between transmitter 12 and process control room 22.

Transmitter 12 includes a pressure sensor (in this example a pressure sensor die) 40 which can operate in accordance with any appropriate technique. Example techniques include micro machine configurations, for example, which have an element with an electrical property which changes in response to applied pressure. Process coupling 42 couples a body or housing 18 of transmitter 12 to process piping 14. This allows process pressure P to be applied to isolation diaphragm 50 of transmitter 12. The pressure P causes a deflection in the diaphragm 50 which is transmitted through a fill fluid, such as silicone oil, in capillary tube 52 to pressure sensor 40. Thus, isolation diaphragm 50 has a first side that contacts the process fluid and an opposite side that contacts the fill fluid. Capillary tube 52 extends through pressure sensor module 54 which also supports pressure sensor 40. Pressure sensor 40 provides an electrical output 60 to measurement circuitry 62. Measurement circuitry 62 connects to a terminal block 70 which couples to the process control loop 20. In one example configuration, process control loop 20 is also used to provide power to circuitry, such as measurement circuitry 62, of transmitter 12.

Figure 2:
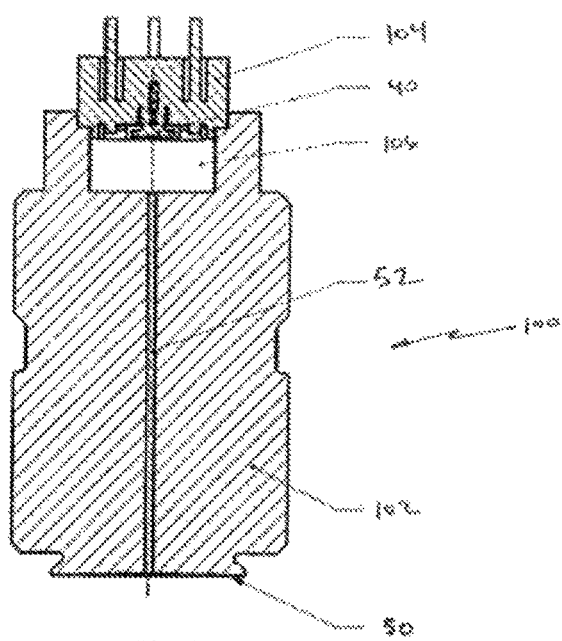
FIG. 2 is a cross sectional view of a portion of a known isolation assembly.

FIG. 2 is a diagrammatic cross sectional view of a pressure sensor module for a process fluid pressure transmitter in accordance with the prior art. Module 100 includes body 102 having a capillary tube 52 extending therethrough. Capillary tube 52 contains a fill fluid, such as silicone oil, which fluidically couples pressure exerted on isolation diaphragm 50 by process fluid to pressure sensor 40. Body 102 is typically formed of stainless steel and isolation diaphragm 50 is welded to body 102. An upper portion of body 102 generally includes a stainless steel sensor housing or header 104 that is welded to body 102 with pressure sensor 40 located proximate a bottom surface thereof. A cylindrical chamber 106 is filled with the fill fluid such that any pressure exerted on isolation diaphragm 50 is conveyed to and sensed by pressure sensor 40. While the structure illustrated in FIG. 2 operates very well in many environments, it has limitations when used in a sea-water environment. Specifically, the module has considerable weight and is not well-suited for long-term exposure to sea-water. While the entire structure could be formed of a metal or alloy that is substantially impervious to the corrosive effects of sea-water, such as titanium, such a structure would not be cost effective.

Figure 3:
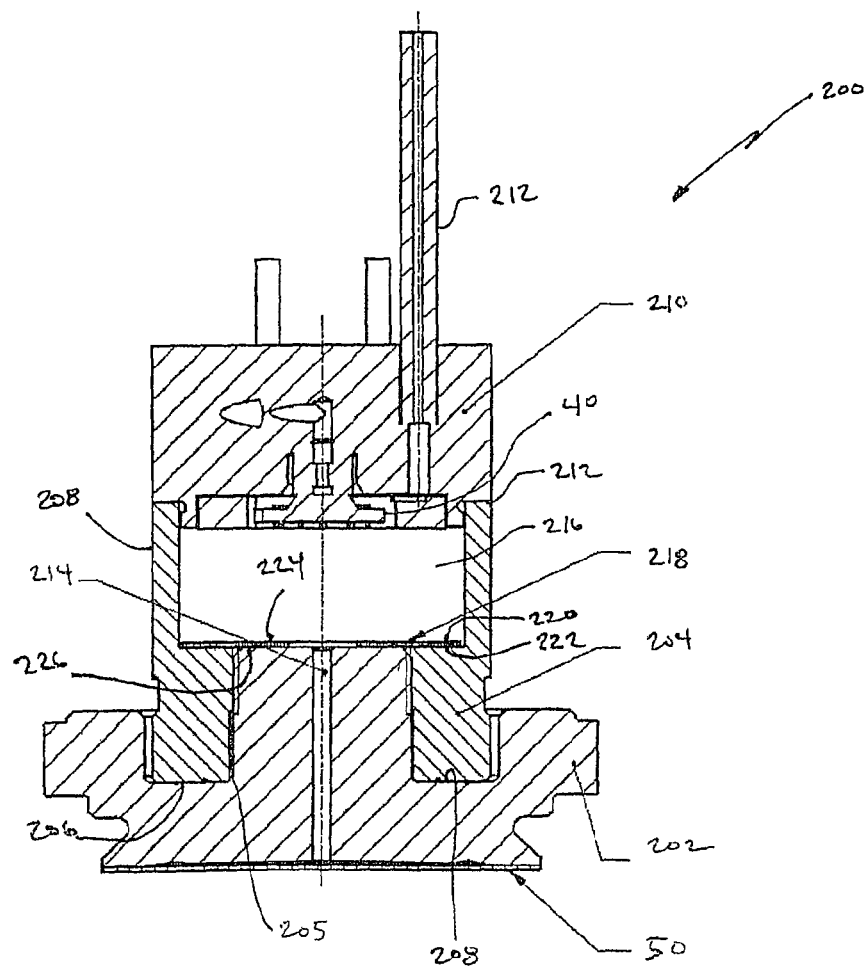
FIG. 3 is a cross sectional view of a pressure module for a pressure transmitter in accordance with an embodiment of the present invention.

FIG. 3 is a diagrammatic cross-sectional view of a pressure sensor module in accordance with an embodiment of the present invention. Module 200 includes a two-part housing, with each member of the housing being formed of a different metal or alloy. A first member 202 is formed of a material that is suitable for exposure to seawater. Examples of such material include titanium, but may also include other metals or alloys that are suitable for long-term exposure to seawater, such as Alloy C-276. Second member 204 is formed of a lower cost metal than first member 202. An example of a suitable metal for the construction of second member 204 is stainless steel. Second member 204, in one embodiment, includes an annular rim 206 that is received within annular groove 208 of first member 202. In one embodiment, first member 202 and second member 204 are threaded together at fastening section 205 to form a removable, robust mechanical coupling. However, any suitable mechanical coupling (such as one that uses other types of fasteners) can be employed. Moreover, the assembly could be manufactured as a single piece using a shrink fit. In such case, the two members are only separable under great force and/or with the application of differential temperatures to the two pieces. While many types of couplings can be employed, it is preferred that the coupling be removable.

Second member 204 includes a cylindrical sidewall 208 that couples to header 210 at weld 212. In one embodiment, second member 204 and header 210 are formed of the same metal, such as stainless steel, which facilitates the welding process. Header 210 mounts pressure sensor 40 on a bottom surface thereof. Suitable electrical connections extend from pressure sensor 40 through header 210 and couple to suitable pressure transmitter measurement circuitry, such as circuitry 62 (shown in FIG. 1). Header 210 also includes fill tube 212 that allows fill fluid to be introduced into the system and then sealed therein. When filled with the fill fluid, pressure applied at isolation diaphragm is conveyed through passageway 214 into chamber 216 and ultimately to pressure sensor 40. The process fluid pressure acts on all surfaces within chamber 216. In accordance with an embodiment of the present invention, seal 218 is disposed to seal the interface between first member 202 and second member 204. Seal 218 is preferably welded to both first member 202 and second member 204. In one embodiment, a pair of continuous, annular welds are provided. A first weld 220 couples seal 218 to surface 222 of second member 204, while a second weld 224 couples seal 218 to surface 226 of first member 202. However, embodiments of the present invention can be practiced by using a single weld positioned at the interface between first member 202 and second member 204.

Since first member 202 and second member 204 are formed of different metals or alloys, seal 218 is preferably constructed from a third metal or alloy having a melting point between those of the first and second members 202, 204, respectively. In one embodiment, first member 202 is constructed from titanium; second member 204 is constructed from stainless steel; and seal 218 is constructed from tantalum. One particular advantage provided by embodiments of the present invention, is that seal 218 does not need to bear the mechanical forces to couple first member 202 to second member 204. Instead seal 218 only needs to keep fill fluid from leaking into the interface between members 202 and 204. This function is facilitated by the self-energizing design of seal 218 in chamber 216. Specifically, as the pressure within chamber 216 increases, the pressure will cause seal 218 to be urged to a greater degree against respective surfaces 226, 222 of first member 202 and second member 204 thereby increasing the seal's effectiveness. Using a tantalum ring seal 218 between first and second members 202, 204 along surfaces 226, 222 provides reliable welding of the dissimilar metals or alloys, i.e. high melting point metal, which is substantially impervious to the corrosive medium and stainless steel.

Although the present invention has been described with reference to preferred embodiments, workers skilled in the art will recognize that changes may be made in form and detail without departing from the spirit and scope of the invention. For example, while embodiments of the present invention are described with respect to specific materials (titanium, stainless steel and tantalum) embodiments of the present invention can be practiced with any suitable group of metals or alloys as long as the third material has a melting point sufficiently close to the first two metals or alloys to allow reliable welding.

What is claimed is:

1. A pressure sensor module for a process pressure transmitter, the pressure sensor module comprising:
    a first member formed of a first metal suitable for exposure to seawater, the first member having a first end and a second end and a passageway extending therethrough,
    an isolation diaphragm coupled to the first end of the first member and having a first side configured to contact, a process fluid and an opposite side in fluidic communication with the passageway;

a second member, formed of a second metal different than the first metal, the second member being mechanically coupled to the first member to define a chamber that is fluidically coupled to the passageway at the second end of the first member;

a pressure sensor disposed to sense a pressure within the chamber; and a seal welded to the second end of the first member and the second member to seal an interface between the first and second members.

2. The pressure sensor module of claim 1, wherein the first and second members are removably coupled together.

3. The pressure sensor module of claim 2, wherein the first and second members are threaded together.

4. The pressure sensor module of claim 2, wherein the first and second members are mechanically coupled together with fasteners.

5. The pressure sensor module of claim 2, wherein the first and second members are mechanically coupled together with a shrink fit.

6. The pressure sensor module of claim 1, wherein the seal is a self-energizing seal.

7. The pressure sensor module of claim 6, wherein the self-energizing seal is welded to both the first and second members.

8. The pressure sensor module of claim 1, wherein the seal is welded to the first member at a first continuous weld at the second end and is welded to the second member at a second continuous weld adjacent to the second end.

9. The pressure sensor module of claim 1, wherein the first member is formed of titanium.

10. The pressure sensor module of claim 9, wherein the second member is formed of stainless steel.

11. The pressure sensor module of claim 10, wherein the seal is formed of tantalum.

12. The pressure sensor module of claim 1, wherein the pressure sensor module is embodied within a pressure transmitter and wherein the pressure sensor is coupled to measurement circuitry of the pressure transmitter.

13. The pressure sensor module of claim 1, wherein the second member has a portion that extends around an inner portion of the first member.

14. The pressure sensor module of claim 1, wherein the second member includes an annular rim that is received within an annular groove of the first member.

15. The pressure sensor module of claim 1, wherein the first metal comprises a first metal alloy, and wherein the second metal comprises a second metal alloy.

16. The pressure sensor module of claim 1, further comprising a diaphragm seal welded to the first end of the first member and the isolation diaphragm.

* * * * *